United States Patent [19]
Schroeder et al.

[11] Patent Number: 5,084,294
[45] Date of Patent: * Jan. 28, 1992

[54] CULINARY MIXES FOR PRODUCTS PREPARED FROM BATTERS AND DOUGHS WITH FISH OILS STABILIZED WITH FRUCTOSE

[75] Inventors: Lisa R. Schroeder, Brooklyn Park; Dorothy J. Muffett, Bloomington, both of Minn.

[73] Assignee: General Mills, Inc., Minneapolis, Minn.

[*] Notice: The portion of the term of this patent subsequent to Apr. 3, 2007 has been disclaimed.

[21] Appl. No.: 421,293

[22] Filed: Oct. 5, 1989

Related U.S. Application Data

[63] Continuation-in-part of Ser. No. 148,520, Jan. 26, 1988, abandoned.

[51] Int. Cl.$^5$ .............................................. A21D 10/04
[52] U.S. Cl. ..................................... 426/545; 426/546; 426/553; 426/554
[58] Field of Search ............... 426/541, 544, 545, 546, 426/330.6, 331, 553, 554, 549

[56] References Cited

U.S. PATENT DOCUMENTS

| | | | |
|---|---|---|---|
| 3,170,796 | 2/1965 | Audre et al. | 426/554 |
| 4,363,823 | 12/1982 | Kimura et al. | 426/613 X |
| 4,396,635 | 8/1983 | Roudebush et al. | 426/554 X |
| 4,419,377 | 12/1983 | Seward et al. | 426/553 X |
| 4,456,626 | 6/1984 | Nelson et al. | 426/553 X |
| 4,504,510 | 3/1985 | Alibeito et al. | 426/553 |
| 4,913,921 | 3/1990 | Schroeder et al. | 426/321 |

OTHER PUBLICATIONS

Furia, Handbook of Food Additives, 1968, the Chemical Rubber Co.: Cleveland, Ohio, p. 126.

*Primary Examiner*—Joseph Golian
*Attorney, Agent, or Firm*—Dorsey & Whitney

[57] ABSTRACT

Disclosed are food products, especially culinary mixes and baked goods prepared therefrom which contain nonhydrogenated fish oil yet which exhibit enhanced stability of the fish oil against flavor and aroma degradation. The improved food products are stabilized by the incorporation of the food product such that the weight ratio of fructose to fish oil is a least about 0.05:1. Surprisingly, incorporation of modest amounts of fructose in food products within the indicated minimum provides a stabilizing effect of the high unstable fish oil. The present invention finds particular suitability for use in connection with fish oil rich in omega-3 fatty acids.

11 Claims, No Drawings

CULINARY MIXES FOR PRODUCTS PREPARED FROM BATTERS AND DOUGHS WITH FISH OILS STABILIZED WITH FRUCTOSE

CROSS REFERENCE TO RELATED APPLICATION

This application is a continuation in part application of copending application Ser. No. 148,520 filed Jan. 26, 1988 now abandoned.

BACKGROUND OF THE INVENTION

1. Technical Field

The present invention relates to food products. More particularly, the present invention relates to culinary mixes and to baked goods containing fish oils characterized by better flavor and enhanced stability.

2. Background Art

A great deal of attention has been paid recently to the various health benefits apparently associated with consumption of fish rich in fish oil. Health benefits appear to be related to the presence of high levels of the n-3 family of polyunsaturated fatty acids. Oils containing such materials, such as fish oils, are referred to as "omega 3" oils and desirably contain high levels of n-3 fatty acids, especially eicosapentaenoic acid ("EPA") and docosahexaenoic acid ("DHA"). Such fatty acids are called "omega-3" since the first double bond occurs in the third carbon bond counting from the end or omega position of the fatty acid.

Notwithstanding the present interest in the health benefits of fish oil consumption, nonhydrogenated fish oil generally to date has not been widely used per se or as an ingredient in processed food products for use by humans due to notorious and severe problems in odor and flavor. However, gelatin capsules containing fish oil are available. Additionally, salmon oil has been added to canned salmon. Also, certain canned meat products have been marketed in Japan which have had refined fish oil added as a fortifier.

Hydrogenated fish oils are much more stable due to the decrease in the degree of polyunsaturation and are widely used in Europe for margarine. Hydrogenated fish oils have also been used in Scandinavian countries in other consumer products, e.g., finished cake. (See also U.S. Pat. Nos. 3,168,405, 3,268,337, 3,366,487) and margarine (see "Use of Fish Oils in Margarine and Shortening," Chapter 18, Fish Oils, Avi Publishing Co., Inc. 1968). Hydrogenation is also effective in reducing odor and flavor after deodorization. However, hydrogenation by decreasing polyunsaturation including the n-3 fatty acid component correspondingly decreases the health value of fish oil. Accordingly, it would be desirable to realize food products containing such nonhydrogenated fish oils, but the instability of the fish oil to date has prevented the development of such food products.

The principal approach taken in the art to utilize nonhydrogenated fish oil in processed foods generally has bee to employ fish oils of enhanced stability. Two broad approaches have been taken in the art to realize nonhydrogenated fish oils of enhanced stability. The first approach involves giving attention to the processing of the oil to achieve a cleaner, finished oil product. Particular attention has been given to the deodorization step in order to realize cleaner finished fish oil products.

In the second approach, the art has attempted to find adjuvants which can be added to finished fish oil to provide desired additional stability. For example, while the phenomenon of fish oil degradation is not completely understood, it is known, however, that oxidative rancidification is a contributing factor. Addition of known antioxidants, singly as well as commercial mixtures, some allegedly synergistic, does result in some increase in stability. However, the instability of nonhydrogenated fish oils is so great, that even addition of such materials at maximum legally permitted levels provides only modest increases in stability.

Given the severe difficulties in realizing a suitable fish oil ingredient, it is understandable that comparatively little developmental effort has been made to formulate processed food products containing fish oil.

The prior art also includes U.S. Pat. No. 4,357,362 (issued Nov. 2, 1982 to David Barker). This patent discloses a pet food composition including fish material of reduced fishy odor by subjecting the composition in a sealed container, to sterilizing heat in the presence of a reducing agent. However, several disadvantages or limitations exist with this approach. First, the primary advantage is a fish odor reduction which is not necessarily directly related to the problems of fish oil flavor degradation. Second, a severe heat treatment in a sealed container is required in order to achieve the reduction in odor. It is undesirable for many foods to be subjected to such severe heat treatment. Third, fish flesh or fish proteinaceous material is known to have a material effect on stability. However, most food products cannot contain fish flesh as a practical matter, e.g., mayonnaise, yet could beneficially include fish oil were oil stability nonetheless obtained. Also, the product is less susceptible to oxidative rancidity since it is sealed. Finally, a wide variety of organic and inorganic reducing agents are taught as useful although reducing sugars are preferred.

Still another problem exists with the utilization of fish oil in baked goods which is peculiar to their method of preparation. Baked goods, of course, are prepared from batters by a baking step, typically as short as 6 minutes for cupcakes or muffins to as long as 40 minutes for larger layer cakes in a baking oven at 300° F. to 400° F. Exposure of nonhydrogenated fish oil to oxygen in the presence cf moisture at these elevated temperature conditions would quickly cause development in clean fish oils of a strong and unpalatable fishy flavor. Conventional layer cakes with added, very clean, antioxidant stabilized, nonhydrogenated deodorized fish oils exit the oven with an impalatable fish flavor.

Given the state of the art with regard to fish oil stabilization, there is a continuing need for the development of new and improved processed food products containing fish oil of improved stability.

Accordingly, it is an object of the present invention to provide food products containing nonhydrogenated fish oils which nonetheless exhibit improved stability against degradation in both flavor and odor.

It is an object of the present invention to provide culinary mixes for baked goods containing nonhydrogenated fish oil.

It is another object of the present invention to provide food products of enhanced stability which do not require heat sterilization Another object of the present invention is to provide food products containing fish oil which do not require fish meat.

Still another object of the present invention is to provide food products containing fish oil of enhanced stability against flavor degradation.

Another important object is to provide food products with water which contain fish oil yet nonetheless exhibit increased stability.

It has been surprisingly discovered that the above objectives can be realized and superior culinary mixes for baked goods and baked goods containing fish oils can be prepared by incorporation of modest amounts of fructose. Surprisingly, fructose alone among sugars and other materials appears to be unexpectedly superior in providing the desired stabilization benefits.

SUMMARY OF THE INVENTION

The present invention relates to culinary mixes for products prepared from batters and doughs containing fish oils of enhanced stability and to the baked goods themselves. In addition to common culinary mix ingredients of flour, shortening and leavening, the present compositions further essentially comprise finished deodorized, nonhydrogenated fish oils stabilized with minor amounts of fructose. The fish oils also essentially include the maximum permitted levels of TBHQ and also contain tocopherol. The present invention further provides finished baked goods containing fish oil.

DETAILED DESCRIPTION OF THE INVENTION

The present invention resides in culinary mixes for products prepared from batters and doughs, especially baked goods and to the finished goods themselves containing nonhydrogenated fish oil but which are substantially free of fish flesh. Nonetheless, the present finished goods are characterized by enhanced oil stability by virtue of the incorporation of minor amounts of fructose relative to similar compositions but not containing the requisite fructose amounts. In its method aspect, the present invention resides in methods for fish oil fortification of finished and baked goods.

Throughout the specification and claims, percentages are by weight and temperatures in degrees Fahrenheit, unless otherwise indicated.

The present invention resides in part in the surprising discovery that otherwise conventional finished farinaceous goods, especially baked goods, and culinary mixes therefor can be prepared that include modest levels of nonhydrogenated, refined, deodorized and stabilized fish oil in partial substitution for other conventional shortening components so long as the goods also meet both of two conditions: first, that the goods include fructose within specified levels; and second, that the fish oil also essentially includes the maximum permitted levels of selected antioxidants. In another aspect, the present invention resides in the discovery that a specific combination of antioxidants, namely, TBHQ and tocopherol, provide unexpected superiority when used in combination with fructose for fish oil stabilization in farinaceous goods. Among all antioxidants or combinations thereof, the combination of TBHQ at its maximum permitted levels plus tocopherol gives surprising fish oil stability benefits compared to other antioxidants or combinations thereof.

Culinary mixes for farinaceous goods to be prepared from batters and doughs are, of course, well known and the skilled artisan will have no problem selecting specific ingredients and their concentrations formulated to prepare specific baked or finished goods and flavors. Indeed, the art is replete with such formulations (See, for example, U.S. Pat. Nos. 3,708,309 issued Jan. 2, 1973 to Johnson et al.; 3,694,229 issued Sept. 26, 1972 to Norsby et al.; 3,366,487 issued Sept. 29, 1969 to Hatton et al.; each of which are incorporated herein by reference.) Culinary mixes typically comprise flour or a farinaceous material, (occasionally corn flour) as the base or principal ingredient, plus shortening (with emulsifiers) and chemical leavening. Typically, for most but not all baked goods, the culinary mixes additionally essentially comprise a nutritive carbohydrate sweetening agent(s) which is typically sucrose and occasionally mixtures of sucrose with other sweeteners.

The term "baked goods" and the culinary mixes therefor is meant to be broadly construed and to include, for example, layer cakes, pound cakes, brownies, muffins, cupcakes, cookies, coffee cakes, bundt cakes and biscuits. Although not literally a "baked good" since they are not baked, pancakes and waffles are also meant to be included since they are similar in formulation Exemplary culinary mix formulations are given below.

|  | Flour | Sugar | Shortening | Leavening |
|---|---|---|---|---|
| Layer cakes and cupcakes | 41 | 45 | 6–12 | 1–2 |
| Muffins | 50 | 25 | 10–15 | 2–3 |
| Cookies | 20–30 | 40–50 | 15–25 | .5–1.0 |
| Biscuits | 80 | 10–18 | 15–20 | 2–3.5 |
| Brownies | 25–30 | 25 | 13–14 | .1–.2 |

Still another essential ingredient of the instant, improved compositions is a refined, deodorized, nonhydrogenated, fish oil. The present food products provide convenient vehicles for delivery for consumption of fish oil to obtain the desirable special nutritional advantages provided by fish oil.

The fish oil is used in partial substitution for the conventional shortening ingredient. Desirably, the fish oils comprise from about 0.1% to 18%, preferably about 4% to 12% of the culinary mixes. The finished baked goods should comprise about 2% to 10% fish oil, preferably about 4% to 8%. The modest differences in the upper values for the fish oil concentrations of the culinary mixes is due to the additional moisture or added solids typically added to the culinary mixes to form batters in baked goods preparation less the minor moisture losses occasioned during baking.

Fish oils are staples of commerce and their general processing is well known (see, for example, Fish Oils: Their Chemistry, Technology, Stability, Nutritional Properties, and Uses, ed. by M. E. Stansby, The Avi Publishing Company, Inc. 1967 and which is incorporated by reference). Especially useful for their therapeutic value herein are oils having a total n-3 fatty acid content of greater than about 20% such as are derived from menhaden oil, herring, capelin, anchovy, cod liver, salmon oil, sardine oil and mixtures thereof. Especially preferred for use herein is menhaden oil due to such supply considerations as cost and availability as well as its nutritional quality as being high in omega-3 fats. Recently, fish oil has been sold in gelatin capsules as a food supplement. However, in the present invention the fish oils are essentially also conventionally processed, e.g., refined and deodorized, to provide what is referred to in the art as a "finished" oil. Unlike vegetable oils, however, fish oils typically do not require degumming. Also, conventional hydrogenation of the fish oil such as is done to make the oil suitable for use for the preparation of margarine is to be strictly avoided.

The nonhydrogenated fish oils used in the present invention are preferably stabilized, i.e., by including conventional oil stabilizing materials at their maximum permitted levels (e.g., 200 ppm of total oil) such as antioxidants selected from the group consisting of TBHQ, (tertiary butyl hydroquinone) BHA (butylated hydroxyanisole) or BHT (butylated hydroxytoluene). Not all food approved antioxidants have been shown to be useful. For example, the use of lecithin has actually been shown to aggravate development of fishy flavors. Even more preferred products further include 1 to 2000 ppm tocopherol in addition to the antioxidant(s). Surprisingly, the combination of TBHQ and tocopherol has unexpectedly been found to be superior to other antioxidants or antioxidant combinations generally considered to be equivalents or substitutes. Thus, TBHQ is the antioxidant of choice. Still more preferred products include 10 to 100 ppm (based on total oil) of a chelating agent desirably selected from the group consisting of citric acid, phytic acid, ethylene diamine tetra acetate and mixtures thereof. The food products can also beneficially include about 0.1% to 3% of the fish oil of an oil soluble flavor masking agent based upon the weight of fish oil.

Preferred flavor masking agents include citrus oils, especially lemon oil.

Preferably, the fish oils useful herein are prepared in accordance with the method described in U.S. Pat. No. 4,804,555 entitled "Process for Simultaneous Deodorization and Cholesterol Reduction of Fats and Oils." The process there disclosed involves a process involving deaerating fish oil, mixing the oil with steam, heating, flash vaporization and thin film stripping with counter current steam (all steps being performed under vacuum). The finished fish oil prepared according to this method is additionally characterized both by reduced cholesterol (generally at cholesterol levels of less than about 400 mg/g, preferably less than about 250 mg/g) and enhanced stability by enhanced initial quality.

It is essential that the present culinary mixes and baked goods containing fish oil also contain fructose in order to realize the oil stability advantages discovered herein. Of course, fructose has been taught as useful for addition to culinary mixes at varying levels in substitution for conventional sucrose. It is essential, however, that present food compositions comprise fructose such that the weight ratio of fructose to fish oil's is at least about 5 to 30:100. Insufficient fructose can result in rapid deterioration of quality of the food product. As the oil degrades, the resultant fishy flavor and aroma increases rendering the food product increasingly unpalatable. Excessive fructose levels can result in products characterized by undesirable sweetness without obtaining proportional increases in oil stability, if any. Better results in terms of obtaining oil stabilization benefits without excessive sweetness are obtained when the food compositions contain fructose to oil in a ratio of at least 10:100. Best results are obtained when the food products contain fructose to oil in a ratio of at least 20:100.

The fructose can be provided from both relatively pure and less pure sources While pure crystalline fructose of various types and sources are commercially available, fructose in the form of high fructose corn syrup is practical from both a source availability and cost fructose corn syrup functions not only to provide the essential fructose fish oil stabilizer, but also functions as a sweetener. Less preferred but nonetheless useful herein are less pure sources of fructose, e.g., corn syrup, honey, maple syrup solids, fruit juice solids and the like.

Surprisingly, only fructose has been found to provide the high stabilization benefits of the present invention at the concentrations taught as essential herein and no satisfactory explanation can be set forward as to why fructose provides such unexpected results. Other reducing agents, whether organic or inorganic have not been found to provide the combined advantages of fructose of stabilization at relatively low levels and without cloying sweetness. Glucose, a closely related sugar has been found to exhibit some fish oil stabilization activity. However, relative to fructose at the same levels, it is much less effective. Xylose has also been found to have some fish oil stabilization activity, but due to its cost, commercial availability and low benefit activity level, is not a good substitute for fructose.

In certain instances during development of the present invention, sucrose has ostensibly been shown to give some apparent fish oil stabilization benefits. Upon analysis, however, it is speculated that the appearance of benefits by sucrose derive in fact from fructose resulting from spontaneous hydrolysis or inversion of sucrose into glucose and fructose. Thus, sucrose per se is not believed to provide fish oil stabilization but, as surprisingly discovered, only by fructose.

Other useful food products containing fish oil and fructose are described in detail in our patent entitled Food Products Containing Fish Oil Stabilized With Fructose, U.S. Pat. No. 4,913,921 issued Apr. 3, 1990, and which is incorporated herein by reference.

For many mixes it is accepted practice for the consumer to add the required amount of eggs to the mix in the course of batter preparation and this practice can be followed with the mixes of the invention. If desired, the inclusion of egg solids in the mix is an allowable alternative. The function and permissible variations in the remaining ingredients are apparent to those skilled in the art. For example, various amounts of ingredients such as flavors, colors, dry milk solids, water ginders, e.g., a hydrophilic colloid such as carboxymethyl cellulose. salt and the like can be added if desired.

The culinary mix of the present invention can be prepared as a two part culinary mix including the fructose and various other dry ingredients in one part and the fish oil and antioxidants in a second part, which parts are packaged and stored separately and subsequently conventionally processed and blended to form a free flowing dry mix. For example, the mixes of this invention can be compounded by blending the flour, sugar, fructose, and shortening into a homogeneous premix in a ribbon blender, and then passing this premix through a hammermill to eliminate any lumps which may be formed. Any additional ingredients, e.g., egg solids, milk solids, nuts can then be added by mixing to form a free flowing mix. The prepared dry mix can then be conventionally pouched and/or packaged.

In the two part culinary mix described above, the fish oil is separately packaged from the other dry mix ingredients in a hermetically sealed, inert gas flushed, opaque container. The two pouches are conveniently placed together in a suitable container, e.g., cardboard box.

The present mixes prepared as described above are conveniently prepared into finished baked goods by admixing with water, and/or milk, and other optional ingredients, e.g., eggs, vegetable oil, to form a batter or dough, and baking or otherwise heating, e.g., frying, grilling or microwave heating. Useful doughs and batters have the following moisture contents:

| Baked Good | Moisture Content | |
|---|---|---|
| | Useful | Preferred |
| Biscuit (American Style) | 30–40% | 35% |
| Cake | 35–45% | 38% |
| Brownie | 14–25% | 18% |
| Cookie | 9–14% | 12% |

The finished baked good made in accordance with the present invention is characterized with a greatly less than expected development of a fishy flavor both as it leaves the oven and during a normal period required for consumption thereafter.

In the consumer setting, it should be noted that different types of baked goods will have different odor and flavor stability or shelf life at room temperature. This difference is due principally to the particular baked product in question and the characteristics and ingredients of such product. However, in all cases tested, baked goods prepared using fructose in accordance with the present invention exhibited significantly enhanced odor and flavor stability than those same baked goods made without fructose.

For example, cookies made using fructose in accordance with the present invention exhibited odor and flavor stability not only immediately after baking, but for three to four weeks thereafter This reflected a one to two-week extension of stability or shelf life over the same cookies made without fructose.

For chocolate cakes, use of fructose in accordance with the present invention resulted in a baked cake which exhibited acceptable odor and flavor stability not only immediately after it was removed from the oven and cooled, but for two to three days thereafter when allowed to sit at room temperature. In contrast, the same chocolate cake made without fructose exhibited an unacceptable fishy odor and flavor immediately after being removed from the oven and cooled. It is believed that the shelf life of chocolate cake as compared to the example of cookies described above is based principally on the difference in the goods. As compared to cookies, chocolate cake generally has a greater moisture content, is more porous (and therefore has a greater exposure to oxygen), generally lacks many of the spices which are found in cookies and which can function as antioxidants, and has a longer cooking step. All of these factors tend to promote instability of the fish oil. Thus, it would be expected that the general shelf life of a cake at room temperature would be significantly less than that of a cookie.

A further example relates to pancakes. Pancakes made with fructose in accordance with the present invention exhibit odor and flavor stability immediately after cooking and for several days thereafter. In contrast, the same pancakes made without fructose exhibit a fishy odor and flavor immediately after cooking, thus resulting in a generally unacceptable product.

In general, a baked or cooked product made with fructose in accordance with the present invention is free of fishy flavor for the period of time normally required for consumption. This period will generally vary from product to product; however, significant improvement and extended shelf life can be obtained by using fructose. In all cases, the odor and flavor stability and thus shelf life can be further extended by refrigeration or freezing.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure whatsoever. It will be appreciated that other modifications of the present invention, within the skill of those in the food arts, can be undertaken without departing from the spirit and scope of this invention.

EXAMPLE 1

A mix for an oatmeal cookie is prepared having the following formulation:

| Ingredient | Weight % |
|---|---|
| Shortening | 7.15 |
| Fish Oil | 5.00 |
| Brown sugar | 8.40 |
| High fructose corn syrup | 5.00 |
| Sucrose | 7.20 |
| Whole egg solids | 8.60 |
| Water | 4.90 |
| Vanilla | 0.40 |
| Quick oats | 17.30 |
| All purpose flour | 20.00 |
| Sodium bicarbonate | 0.32 |
| Raisins | 15.00 |
| Cinnamon | 0.30 |
| Salt | 0.35 |
| Nutmeg | 0.10 |
| Antioxidant blend[1] | 0.02 |
| | 100.00% |

1. Antioxidant blend consisting of 60% tocopherol available from Henkel Corporation under the trade name Covi-OX T70. 30% TBHQ mixture of (32% glycerol monoleate, 30% corn oil, 20% TBHQ, 15% prophylene glycol and 3% citric acid) available from Eastman Chemical Products Inc. under the trade name TENOX 20A. 10% partially hydrogenated soybean oil with BHA to help protect flavor available from Durkee Industrial Foods, under the trade name Durkex 100.

Baked goods of comparable organoleptic attributes and fish oil stability are obtained when the high fructose corn syrup is replaced with other less pure fructose sources at equivalent fructose levels including 42 D.E. corn syrup.

A culinary mix of the present invention was prepared by blending in a dry mixer a blend of the dry ingredients and shortening of the above formulation. The culinary mix can comprise a first packet comprising this dry blend plus a second packet containing the fish oil.

The baked good was prepared by first forming a wet blend of the dry mix, fish oil and wet ingredients to form a thick batter and measuring out small quantities on a baking sheet and baking for about 10 minutes at 350° F. The resultant oatmeal cookies were characterized by good flavor immediately after baking and for at least 3–4 weeks thereafter.

EXAMPLE 2

A chocolate cake was prepared according to the present invention according to the procedure of Example 1 having the following formulation:

| Ingredient | Weight % |
| --- | --- |
| Sucrose, fine grind | 15.90 |
| All purpose flour | 16.85 |
| Sucrose, regular grind | 2.91 |
| Starch, waxy maize | 1.54 |
| Sodium bicarbonate | 0.40 |
| Salt | 0.45 |
| Mono calcium phosphate | 0.25 |
| Red dutched cocoa | 3.38 |
| Gum, carboxymethyl cellulose | 0.11 |
| Xantham gum | 0.08 |
| Shortening | 5.08 |
| Eggs | 13.20 |
| Water | 20.36 |
| Soybean oil | 4.74 |
| Fish oil | 4.74 |
| Fructose | 10.00 |
| Antioxidant blend[1] | 0.01 |
|  | 100.00% |

1. Antioxidant blend consisting of 60% tocopherol available from Henkel Corporation under the trade name Covi-OX T70 30% TBHQ mixture of (32% glycerol monoleate, 30% corn oil, 20% TBHQ, 15% prophylene glycol and 3% citric acid) available from Eastman Chemical Products Inc. under the trade name TENOX 20A. 10% partially hydrogenated soybean oil with BHA to help protect flavor available from Durkee Industrial Foods, under the trade name Durkex 100.

The resultant cake was characterized by good flavor immediately after baking and for at least 2-3 days thereafter.

We claim:

1. A batter for a baked good comprising water and a culinary mix including a farinaceous material, shortening and leavening, additionally comprising,
   a. about 0.1% to 18% by weight of the culinary mix being a nonhydrogenated refined, deodorized fish oil said fish oil containing,
      i. about 100 to 300 ppm of an antioxidant selected from the group consisting of tertiary butyl hydroquinone, butylated hydroanisole, butylated hydroxytoluene and mixtures thereof,
      ii. about 1 to 2000 ppm of tocopherol, and
   b. about 0.1% to 30% by weight of the culinary mix being fructose, and wherein the weight ratio of fructose to fish oil is at least about 10:100.

2. The batter of claim 1 additionally comprising sugar other than fructose and wherein the fish oil additionally comprises a chelating agent.

3. The batter of claim 1 wherein the fructose comprises about 0.1% to 20% by weight of the culinary mix.

4. A chemically leavened baked good comprising farinaceous material, shortening, leavening and moisture, additionally comprising,
   a. about 0.1% to 18% by weight of the baked good being a nonhydrogenated refined, deodorized fish oil said fish oil containing,
      i. about 100 to 300 ppm of an antioxidant selected from the group consisting of tertiary butyl hydroquinone, butylated hydroanisole, butylated hydroxytoluene and mixtures thereof,
      ii. about 1 to 2000 ppm of tocopherol, and
   b. about 0.1% to 30% by weight of the baked good being fructose and wherein the weight ratio of fructose to fish oil is at least about 10:100.

5. The baked good of claim 4 additionally comprising sugar other than fructose.

6. The baked good of claim 4 wherein the fish oil additionally comprises a chelating agent.

7. The baked good of claim 6 wherein the fructose comprises about 0.1% to 20% by weight.

8. A two part culinary mix comprising:
   a. a first portion separately packaged and comprising a dry mix blend containing a farinaceous material, shortening and leavening and a fructose component in the amount of about 0.1% to 30% by weight of said culinary mix, and
   b. a second portion separately packaged in an inert gas flushed and hermetically sealed opaque container containing a nonhydrogenated refined, deodorized fish oil in the amount of about 0.1% to 18% by weight of said culinary mix, said fish oil containing,
      i. about 100 to 300 ppm of an antioxidant selected from the group consisting of tertiary butyl hydroquinone, butylated hydroxyanisole, butylated hydroxytoluene and mixtures thereof, and
      ii. about 1 to 2000 ppm of tocopherol, said fructose component being present in an amount such that the weight ratio of fructose to fish oil is at least about 10:10.

9. The culinary mix of claim 8 additionally comprising sugar other than fructose.

10. The culinary mix of claim 8 wherein the fish oil additionally comprises a chelating agent.

11. The culinary mix of claim 8 wherein the fructose comprises about 0.1% to 20% by weight.

* * * * *